F. C. FIECHTER, Jr. & J. J. FIECHTER.
LUBRICATOR.
APPLICATION FILED JULY 10, 1912.
1,081,951. Patented Dec. 23, 1913.
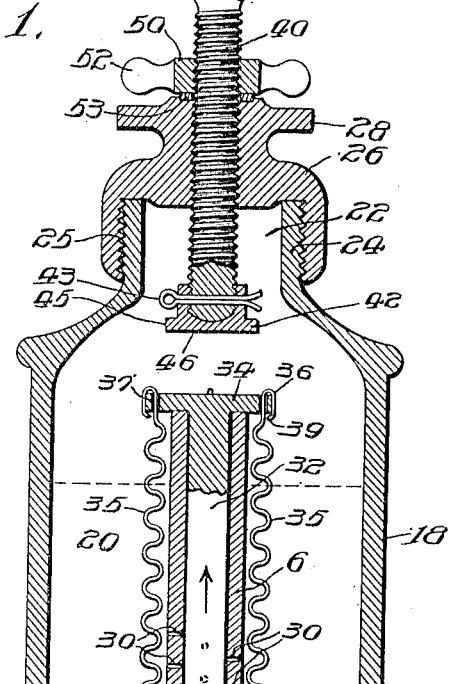
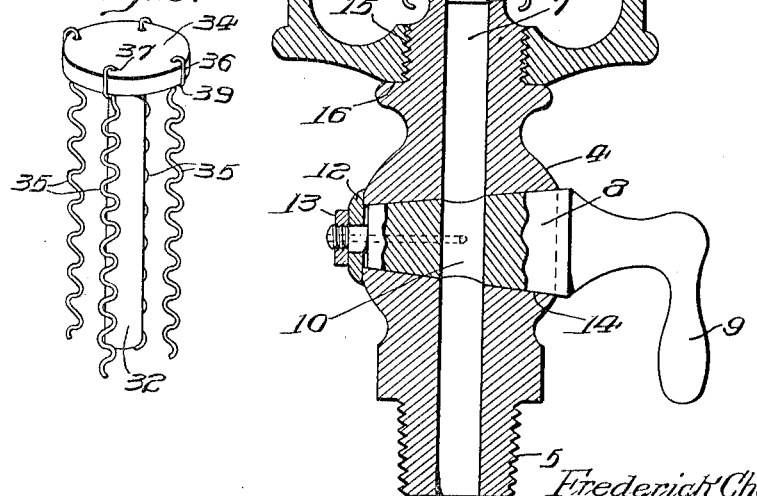
WITNESSES
F. J. Hartman.
Clifton C. Callowell
INVENTORS
Frederick Charles Fiechter, Jr.
John Joseph Fiechter.
BY
ATTORNEY

UNITED STATES PATENT OFFICE.

FREDERICK CHARLES FIECHTER, JR., AND JOHN JOSEPH FIECHTER, OF PHILADELPHIA, PENNSYLVANIA.

LUBRICATOR.

1,081,951.  Specification of Letters Patent. Patented Dec. 23, 1913.

Application filed July 10, 1912. Serial No. 708,556.

*To all whom it may concern:*

Be it known that we, FREDERICK CHARLES FIECHTER, Jr., and JOHN JOSEPH FIECHTER, both citizens of the United States, and residents of the city of Philadelphia, county of Philadelphia, and State of Pennsylvania, have invented certain new and useful Improvements in Lubricators, whereof the following is a specification, reference being had to the accompanying drawing.

This invention particularly relates to that class of lubricators that are especially adapted for automatically dispensing dry or pulverized lubricating material, such as graphite, soapstone, etc.

The principal objects of this invention are, to provide a lubricator that will efficiently dispense a predetermined amount of lubricant automatically at each pulsation of the pressure in the chamber of the mechanism with which it is connected; and to provide means to regulate the amount of lubricant thus dispensed.

Other objects of this invention are, to provide a lubricator with means for agitating the lubricant therein, whereby its uniform discharge is insured; to provide means for controlling the passageway connecting said lubricator with the mechanism to be lubricated; and to provide means for relieving the pressure in said passageway, when closed.

Further objects of this invention are, to provide a lubricator for dispensing pulverized lubricant, so constructed and arranged that the parts may be readily separated and assembled without disturbing its connection with the mechanism to be lubricated.

Briefly stated, this invention includes a controlling valve having a cylindrical extension provided with perforations in its walls; a casing removably connected with said valve and surrounding said cylindrical extension, and providing a chamber adapted to contain lubricant in powdered or pulverized form; a piston or plunger within said cylindrical extension, arranged to be reciprocated by the variation of the pressure in the mechanism to be lubricated; agitating means carried by said piston and depending into said lubricant; a cap for closing said casing; and an adjustable stem in threaded engagement with said cap, having means arranged to limit the throw of said piston.

This invention further includes all of the various novel features of construction and arrangement hereinafter more definitely specified.

In the accompanying drawing, Figure 1 is a central, vertical, sectional view of a valve constructed in accordance with this invention; and Fig. 2 is a perspective view of the piston for controlling the discharge of lubricant from said lubricator.

In said figures, the controlling valve body 4 is provided with the threaded nipple 5, or other suitable connector, for convenient attachment to the mechanism to be lubricated, and the cylindrical extension 6 having the passageway 7 extending through said valve body 4 and controlled by the valve plug 8, which is arranged to be rotated by the handle 9 and which has the aperture 10 arranged to register with the passageway 7 when in open position. Said valve plug 8 is provided with the usual washer 12 and nut 13, which is adjustable to vary the frictional engagement of said plug with the bore 14 of said valve.

The cylindrical extension 6 has the threaded region 15, which terminates in the shoulder 16, against which the casing 18 abuts when in threaded engagement with the threaded region 15, to form a tight joint. Said casing 18 surrounds the cylindrical extension 6 and is arranged to contain pulverized lubricant 20, such as graphite, soapstone, etc., and has its upper end provided with an aperture 22, through which said lubricant may be supplied.

The upper end of the casing 18 is preferably restricted to form the neck 24, which has the exterior screw-threads 25, with which the lubricator cap 26 may be engaged to close said lubricator, and to form a substantially air-tight chamber within the casing 18, said cap being conveniently provided with a polygonal flange 28 for engagement with a wrench or similar device by which it may be rotated for adjustment.

The cylinder 6 is provided with a series of suitable discharge apertures 30 extending through its walls and forming a communication between the chamber within the casing 18 and the passageway 7 through the valve, said apertures 30 being arranged to convey the lubricant 20 to said passageway, and being controlled by the piston or plunger 32, which is loosely mounted in the bore of said cylinder 6 and arranged to be reciprocated therein by the rise and fall of pressure in the passageway 7 to alternately open and close said apertures 30.

The plunger 32 is provided with a head having the peripheral flange 34, which is normally supported upon the upper end of the cylindrical extension 6 and carries a plurality of agitators 35, depending from its periphery and conveniently attached thereto by having their hooked ends 36 extended through suitable apertures 37 in said flange, said hooked ends having an inwardly bent portion 39 to prevent their accidental displacement.

While it is obvious that the agitators 35 may be of any desired form, it is believed to be preferable to form them of crimped wires, as shown in the drawing, to extend their lateral reach.

It will be readily seen that as the plunger 32 is reciprocated by the pulsation caused by the rise and fall of the pressure in the mechanism to be lubricated, the agitators 35 will prevent any tendency of the lubricant to cake or otherwise become agglomerated, and will at all times insure the requisite lubricant material to be presented at the outlet apertures 30 to be forced therethrough by the pressure within the casing 18, caused by a partial vacuum in the passageway 7, or any reduction of pressure below the pressure in said lubricator.

It will be noted that it is desirable to regulate the amount of lubricant dispensed at each reciprocation of the plunger 32, which is preferably accomplished by limiting the throw of said plunger, and which is conveniently effected by the adjustable stem 40, which extends through the cap 26 in threaded engagement therewith, and which is provided at its lower end with a protecting shoe or ferrule 42, engaged therewith by the cotter pin 43 and having the peripheral flange 45 for the purpose of increasing its lower surface 46, with which the head 34 of the plunger 32 engages when thrust upward by pressure in the passageway 7.

The stem 40 is conveniently provided with the hand-wheel 48, by which it may be rotated to vary the distance between the ferrule 42 and the head having the flange 34, when in its normal position, said stem 40 being provided with a lock-nut 50 having wings 52 by which it may be conveniently rotated, and being arranged to be clamped upon the lead washer 53 which serves as a stuffing box to prevent leakage from the chamber inclosed by the casing 18.

The valve plug 8, as shown in Fig. 1, is provided with the duct 55 which is independent of the aperture 10, and which is arranged to communicate with the passageway 7 when the valve body 4 is closed, to relieve any pressure that may be trapped in said passageway 7 and the parts connected therewith.

The lubricator above described may be employed in connection with various classes of mechanism, but is best adapted to lubricate steam, gas, air or hydraulic cylinders, in which the pressure in the chambers upon the opposite sides of the piston is constantly varying.

The operation of the lubricator above described is as follows: The parts being normally in the position shown in Fig. 1, and the passageway 7 being connected with the interior of the cylinder of an engine, pump, etc., to be lubricated, any pressure within said cylinder tends to effect the movement of the plunger 32 in the direction of the arrow indicated thereon, which movement is limited by the engagement with the head having the flange 34 with the furrule 42, in which position the pressure in the passageway 7 is directed through the apertures 30 and the lubricant 20 within the chamber 18. As the pressure decreases in the cylinder, and consequently in the passageway 7, the relatively higher pressure in the chamber within the casing 18 forces the lubricant which is adjacent to the apertures 30, through said apertures into the passageway 7 and carries said lubricant to the mechanism to be lubricated. Thus it will be seen that if the maximum amount of lubrication is desired, the adjusting stem 40 is raised to permit the plunger 32 to travel its maximum stroke and thereby to uncover or open all of the apertures 30 in the walls of the cylindrical extension 6; but if, on the other hand, it is desired to restrict the delivery of the lubricant, said stem 40 is adjusted to limit the stroke and thereby limit the number of apertures 30 which are opened by said plunger.

It will be seen that a lubricator constructed in accordance with this invention may be adjusted to deliver any predetermined quantity of lubricant which may be desired, and that the amount delivered during each reciprocation of the plunger 32 will be uniform.

It is not desired to limit this invention to the precise details of construction and arrangement herein set forth, as various modifications may be made therein without departing from the essential features of the invention as defined in the appended claims. Furthermore, it is to be understood that the expression "pulverized" lubricant is to be construed to include any degree of comminution, such as flaked or powdered material.

Having thus described our invention, we claim:

1. A lubricator for dispensing pulverized lubricant, comprising a casing inclosing a substantially air-tight chamber, a tubular member within said chamber having a passage-way leading therefrom and outlets communicating with said chamber, and means movable within said tubular member for opening and closing said outlets in accordance with the rise and fall of pressure in said passage-way, and means actuated by said movable means for agitating said lubricant.

2. A lubricator for dispensing pulverized lubricant, comprising a casing inclosing a substantially air-tight chamber, a tubular member within said chamber having a passage-way leading therefrom, outlets connecting said chamber and passage-way, means movable within said tubular member for opening and closing said outlets in accordance with the rise and fall of pressure in said passage-way, and means carried by said controlling means for agitating the lubricant in said chamber.

3. A lubricator for dispensing pulverized lubricant, comprising a casing inclosing a chamber, a tubular extension in said casing having a passage-way leading therefrom and having apertures connecting said chamber with said passage-way, a plunger in said tubular member for controlling said apertures, and having a head provided with a flange normally supported by said tubular member, means depending from said flange for agitating the lubricant in said chamber, a cap for said casing forming a substantially air-tight closure for said chamber, and an adjustable stem in threaded engagement with said cap adjustable to vary the throw of said plunger.

4. A lubricator for dispensing pulverized lubricant, comprising a casing inclosing a chamber, a tubular member within said chamber having a passage-way extending therefrom and outlet apertures connecting said chamber with said passage-way, a plunger mounted to reciprocate in said tubular member and having a flange supported by said tubular member, agitators depending from said flange into the lubricant in said chamber, a cap for said chamber, an adjustable stem in threaded engagement with said cap, and having a hand wheel connected therewith, and a ferrule having a broadened surface engageable with said plunger to limit its throw.

5. A lubricator for dispensing pulverized lubricant comprising a valve having its body provided with a cylindrical tubular extension having apertures in its walls, a casing detachably connected with said valve body and surrounding said cylindrical extension, a plunger mounted to reciprocate in said cylindrical extension for controlling said apertures, means carried by said plunger for agitating the lubricant in said chamber, a cap for said casing forming a substantially air-tight closure for said chamber, a stem in threaded engagement with said cap, adjustable to vary the throw of said plunger, a ferrule carried by said stem and having a broadened surface for engagement with said plunger, a lead washer seated in said cap, and a lock nut in threaded engagement with said stem for engaging said washer to lock said stem and seal said cap.

6. A lubricator for dispensing pulverized lubricant comprising a valve having its body provided with a cylindrical tubular extension having apertures in its walls, and a passage-way leading through said valve body, a casing detachably connected with said valve body and surrounding said cylindrical extension, a plunger mounted to reciprocate in said cylindrical extension for controlling said apertures, means carried by said plunger for agitating the lubricant in said chamber, a cap for said casing forming a substantially air-tight closure for said chamber, a stem in threaded engagement with said cap, adjustable to vary the throw of said plunger, a ferrule carried by said stem, having a broadened surface for engagement with said plunger, a lead washer seated in said cap, a lock nut in threaded engagement with said stem for engaging said washer to lock said stem and seal the cap, and a valve plug in said valve body having a duct therein for relieving the pressure in said passage-way when the valve is closed.

In witness whereof we have hereunto set our hands this 6th day of July, A. D., 1912.

FREDERICK CHARLES FIECHTER, Jr.
JOHN JOSEPH FIECHTER.

Witnesses:
CLIFTON C. HALLOWELL,
ALEXANDER PARK.

Copies of this patent may be obtained for five cents each, by addressing the "Commissioner of Patents, Washington, D. C."